United States Patent
Goodman et al.

(10) Patent No.: US 12,470,401 B2
(45) Date of Patent: Nov. 11, 2025

(54) ONBOARDING DATA PROCESSING SYSTEMS USING TRUSTED TOKENS

(71) Applicant: Dell Products L.P., Round Rock, TX (US)

(72) Inventors: Bradley K. Goodman, Nashua, NH (US); Joseph Caisse, Burlington, MA (US); Jerome A. Korthals, Round Rock, TX (US); Jenna Tartaglino, Needham, MA (US)

(73) Assignee: Dell Products L.P., Round Rock, TX (US)

( * ) Notice: Subject to any disclaimer, the term of this patent is extended or adjusted under 35 U.S.C. 154(b) by 145 days.

(21) Appl. No.: 18/362,908

(22) Filed: Jul. 31, 2023

(65) Prior Publication Data

US 2025/0047499 A1    Feb. 6, 2025

(51) Int. Cl.
*H04L 9/32* (2006.01)
*H04L 9/14* (2006.01)

(52) U.S. Cl.
CPC .............. *H04L 9/3247* (2013.01); *H04L 9/14* (2013.01)

(58) Field of Classification Search
None
See application file for complete search history.

(56) References Cited

U.S. PATENT DOCUMENTS

| | | | |
|---|---|---|---|
| 11,449,797 B1 | 9/2022 | Kurniawan | |
| 11,487,708 B1 | 11/2022 | Dangi | |
| 12,155,635 B1 * | 11/2024 | Wan | H04L 67/02 |
| 2009/0222674 A1 | 9/2009 | Leichsenring | |
| 2012/0173874 A1 | 7/2012 | Brown | |

(Continued)

OTHER PUBLICATIONS

Bánáti, A., Kail, E., Karoczkai, K. and Kozlovszky, M., May 2018. Authentication and authorization orchestrator for microservice-based software architectures. In 2018 41st International Convention on Information and Communication Technology, Electronics and Microelectronics (MIPRO) (pp. 1180-1184). (Year: 2018).*

(Continued)

*Primary Examiner* — Luu T Pham
*Assistant Examiner* — Edward X Long
(74) *Attorney, Agent, or Firm* — WOMBLE BOND DICKINSON (US) LLP (57) ABSTRACT

Methods and systems for managing onboarding of data processing systems are disclosed. Data processing systems added to a distributed environment may require onboarding. To onboard the data processing systems, vouchers are required that delegate authority to an entity to onboard the data processing systems. An orchestrator may be an entity responsible for onboarding the data processing systems when they become available. To onboard the data processing systems without intervention by a user, the orchestrator may provide a trusted token to a voucher management service and may obtain the voucher in response. The trusted token may be previously generated through an interaction between the user with authority over the data processing systems and the voucher management service. The trusted token may be provided by the user to the orchestrator to indicate that the orchestrator is trusted by the user to onboard data processing systems associated with the user.

20 Claims, 6 Drawing Sheets

(56) References Cited

U.S. PATENT DOCUMENTS

| | | |
|---|---|---|
| 2015/0032627 A1 | 1/2015 | Dill |
| 2015/0310229 A1 | 10/2015 | Rohleder |
| 2016/0164750 A1 | 6/2016 | Holkkola |
| 2017/0289060 A1 | 10/2017 | Aftab |
| 2017/0302532 A1 | 10/2017 | Maes |
| 2019/0364154 A1 | 11/2019 | Hermanek |
| 2020/0084202 A1 | 3/2020 | Smith |
| 2021/0112034 A1 | 4/2021 | Sundararajan |
| 2021/0336966 A1* | 10/2021 | Gujarathi .............. H04L 9/3247 |
| 2021/0373905 A1 | 12/2021 | Sayyed |
| 2022/0028505 A1 | 1/2022 | Colburn |
| 2022/0240083 A1 | 7/2022 | Goel |
| 2023/0308293 A1* | 9/2023 | Pergament .......... H04L 63/0428 |
| 2023/0370456 A1* | 11/2023 | Marie ................. H04L 63/0815 |
| 2023/0412396 A1 | 12/2023 | Bommisetty |
| 2024/0388510 A1 | 11/2024 | Madtha |
| 2025/0008379 A1 | 1/2025 | Lal |
| 2025/0030561 A1 | 1/2025 | Long |
| 2025/0062980 A1 | 2/2025 | Zhan |

OTHER PUBLICATIONS

Kubovy, J., Huber, C., Jäger, M. and Küng, J., Oct. 2016. A secure token-based communication for authentication and authorization servers. In International Conference on Future Data and Security Engineering (pp. 237-250). Cham: Springer International Publishing. (Year: 2016).*

"BitLocker and Distributed Key Manager (DKM) for Encryption," Microsoft, Jul. 21, 2023, Web Page <https://learn.microsoft.com/en-us/purview/office-365-bitlocker-and-distributed-key-manager-for-encryption> accessed on Jul. 26, 2023 (2 Pages).

Nadeem et al., "A Case for Microservices Orchestration Using Workflow Engines", 2022 IEEE/ACM 44th International Conference on Software Engineering: New Ideas and Emerging Results, pp. 6-10 (Year: 2022).

* cited by examiner

ONBOARDING DATA PROCESSING SYSTEMS USING TRUSTED TOKENS

FIELD

Embodiments disclosed herein relate generally to onboarding data processing systems. More particularly, embodiments disclosed herein relate to systems and methods to efficiently onboard data processing systems using trusted tokens.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing performance of computer-implemented services. The computer-implemented services may be performed by any number of data processing systems throughout a distributed environment. Performance of the computer-implemented services may be managed and/or facilitated by an entity in a distributed environment, such as an orchestrator, a user device and/or any other data processing system (e.g., device).

Data processing systems added to the distributed environment may be onboarded prior to participating in the provision of the computer-implemented services. Onboarding data processing systems may require verification (e.g., using access credentials, etc.) that an entity has authority over the data processing systems.

However, due to the highly distributed nature of some environments, verifying the identity of the user (and, therefore, the user's permissions) upon each instance of onboarding a new data processing system may be time consuming, inefficient, and may ultimately lead to disruptions to the computer-implemented services.

For example, the user may be prompted to provide access credentials (e.g., a password, etc.) to a voucher management service following each purchase of a data processing system. The voucher management service may provide a voucher to the user in response, the voucher being usable to gain authority over the data processing system. The user may, however, purchase a large number of data processing systems over time and may not have adequate resources (e.g., availability, etc.) to provide the access credentials timely upon each purchase. Consequently, computer-implemented services expected to be provided by the new data processing systems may be delayed until the user has adequate resources to provide the access credentials.

To reduce the impact of onboarding data processing systems on the provision of the computer-implemented services in a highly distributed environment, authority may be delegated to another entity (e.g., other than a device operated by the user) to onboard data processing systems as they are added to the distributed environment. By doing so, the entity (e.g., an orchestrator) may efficiently onboard data processing systems without an interaction with the user.

To do so, the voucher management service may provide the voucher directly to the orchestrator instead of the user when the orchestrator identifies that a new data processing system is available for onboarding. To provide the voucher to the orchestrator without user intervention, the voucher management service may obtain a trusted token from the orchestrator. Following receipt of the trusted token, the voucher management service may validate the trusted token and provide the voucher to the orchestrator.

The trusted token may serve as a means of demonstrating that authority has been designated to the orchestrator by the user to onboard data processing systems purchased by the user. The trusted token may be previously generated through an interaction between the voucher management service and the user and subsequently provided by the user to the orchestrator. The interaction may include the following actions by the voucher management service: (i) obtaining the access credentials from the user, (ii) validating the access credentials, (iii) generating the trusted token, and/or (iv) providing the trusted token to the user.

Thus, the user may delegate authority to the orchestrator via a one-time interaction with the voucher management service. Consequently, data processing systems may be onboarded through an automated process without intervention by the user and the computer-implemented services provided by the data processing systems may be subject to fewer interruptions, delays, and/or other undesirable changes that may impact the recipient of the computer-implemented services.

In an embodiment, a method of managing data processing systems is provided. The method may include: obtaining a data package from an orchestrator that is attempting to onboard a data processing system of the data processing systems; making a determination regarding whether the data package comprises a trusted token; in an instance of the determination in which the data package comprises the trusted token: obtaining a voucher for the data processing system, the voucher comprising a public key from the data package; and providing the voucher to the orchestrator to facilitate the onboarding of the data processing system.

The method may also include: prior to obtaining the data package: obtaining a request for the trusted token; making a second determination regarding whether the request comprises access credentials for a user that has authority over the data processing system; and in an instance of the second determination in which the request comprises the access credentials: providing the trusted token to a requestor.

The request may include credentials for the orchestrator, wherein the trusted token includes: a payload comprising the credentials for the orchestrator, and a signature generated using a trusted private key.

The trusted token may include: credentials for the orchestrator; and a trusted signature.

The data package may include: the trusted token; the credentials for the orchestrator; and the public key for the orchestrator.

The voucher may include: verification data usable to validate a root of trust for the data processing system; and at least one delegation of authority from the root of trust to the public key.

The root of trust may be a designated private key and the verification data may be a corresponding public key for the designated private key.

The at least one delegation of authority may include: a certificate including: a payload comprising an intermediate public key; and a signature generated using the designated private key.

The certificate may also include: a second certificate including: a second payload including the public key for the orchestrator; and a second signature generated using an intermediate private key corresponding to the intermediate public key.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Figure 1:
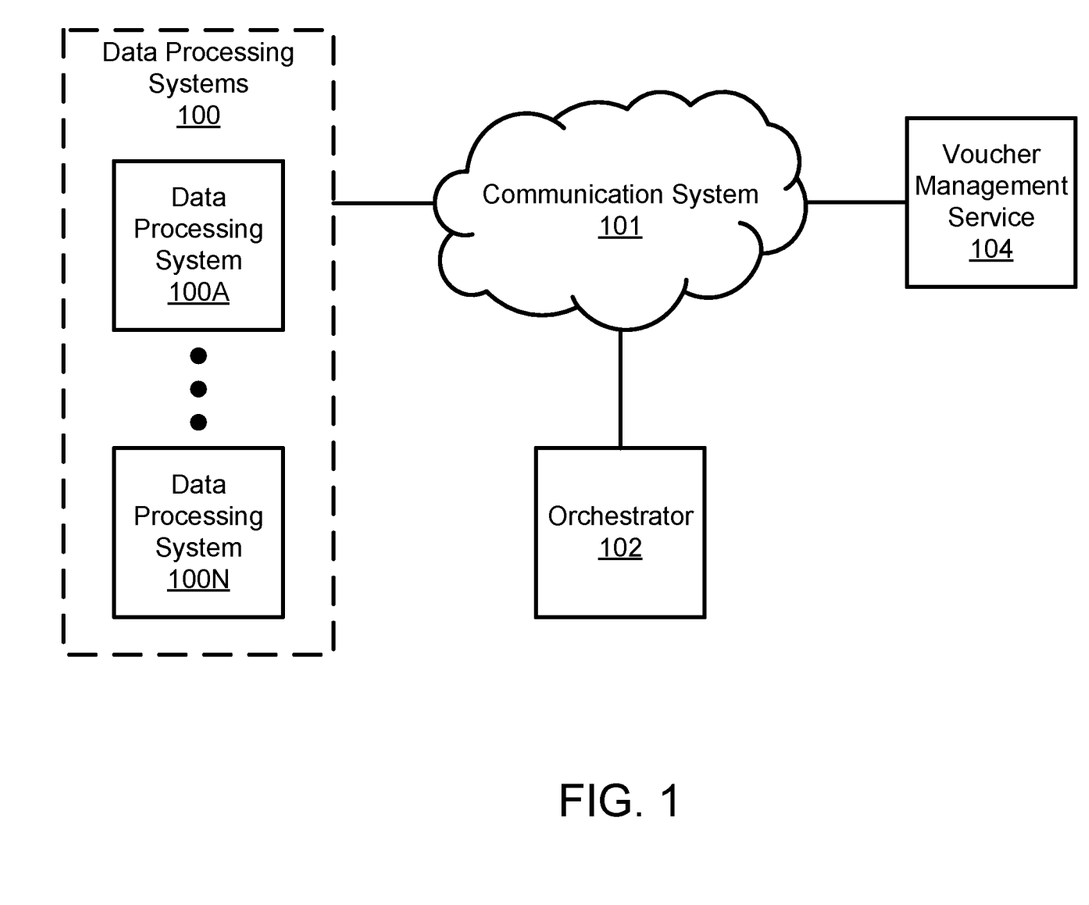
FIG. 1 shows a block diagram illustrating a system in accordance with an embodiment.

Turning to FIG. 1, a block diagram illustrating a system in accordance with an embodiment is shown. The system shown in FIG. 1 may provide computer-implemented services. The computer-implemented services may include any type and quantity of computer-implemented services. For example, the computer-implemented services may include data storage services, instant messaging services, database services, and/or any other type of service that may be implemented with a computing device.

To manage performance of the computer-implemented services, a distributed environment may include any number of data processing systems 100. Each data processing system of data processing systems 100 may be onboarded prior to participating in provision of the computer-implemented services. To onboard a data processing system of data processing systems 100 (e.g., data processing system 100A) an entity (e.g., a person/business that owns the data processing system) with authority over data processing systems 100 may obtain a voucher from voucher management service 104.

To obtain the voucher, the entity with authority over data processing systems 100 (e.g., a user) may present access credentials to voucher management service 104. The access credentials may include any authentication factor (e.g., a password, a pin, a biometric factor, etc.) usable to verify the identity and permissions of the user.

However, in a distributed environment that includes a large number of data processing systems 100, the user may not have adequate resources (e.g., hours, computing resource availability, etc.) to provide access credentials prior to each onboarding process for obtaining ownership vouchers for each to-be-onboarded device. Therefore, delays in onboarding data processing systems 100 may lead to reductions in the availability and/or quality of the computer-implemented services to downstream consumers, onboarding of large numbers of devices may place unreasonable cognitive loads on users responsible for managing onboarding, etc.

In general, embodiments disclosed herein may provide methods, systems, and devices for onboarding data processing systems without (and/or with reduced levels of) user intervention. To onboard data processing systems without user intervention, a trusted token may be used. The trusted token may be generated by voucher management service 104 and may be usable to delegate authority to another entity throughout the distributed environment (e.g., orchestrator 102) to manage onboarding of data processing systems 100.

To generate the trusted token, the user (e.g., via a user device that may be one of data processing systems 100) may present the access credentials to voucher management service 104 and voucher management service may authenticate the access credentials. If the identity of the user is verified using the access credentials, voucher management service 104 may generate the trusted token and may provide the trusted token to the user. The user may then provide the trusted token to orchestrator 102.

Consequently, whenever a new data processing system is added to the distributed environment, orchestrator 102 may provide a data package (e.g., including the trusted token) to voucher management service 104. Voucher management service 104 may recognize the trusted token and may provide a voucher to orchestrator 102. Orchestrator 102 may use the voucher to onboard (and otherwise manage) the new data processing system.

Thus, data processing systems of data processing systems 100 may be onboarded without intervention by the user. By doing so, onboarding of data processing systems 100 may be streamlined and provision of the computer-implemented services may experience fewer interruptions (e.g., reduced down time during onboarding of new data processing systems, etc.).

To provide the above noted functionality, the system may include data processing systems 100, orchestrator 102, and voucher management service 104. Each of these components is discussed below.

To provide the computer-implemented services, the system may include any number of data processing systems 100. For example, data processing systems 100 may include one data processing system (e.g., data processing system 100A) or multiple data processing systems (e.g., 100A-100N). Each data processing system of data processing systems 100 may include hardware and/or software components configured to provide the computer-implemented services. Data processing systems 100 may provide various computer-implemented services independently and/or cooperatively.

All, or a portion, of data processing systems 100 may provide (and/or participate in and/or support the) computer-implemented services to various computing devices operably connected to data processing systems 100. Different data processing systems may provide similar and/or different computer-implemented services. For example, data processing system 100A may be a user device used to interact with voucher management service 104 to generate the trusted token. Additionally, data processing system 100N may be a new data processing system requiring onboarding to the distributed environment.

Data processing systems 100 may be manufactured and/or owned by a first party, and provided (e.g., sold) to other parties for use in computer-implemented services. When provided to the other party, a voucher may be used to transfer control over a data processing system to the other party. To facilitate the transfer, each of data processing systems 100 may contact a rendezvous system by default. The rendezvous system may direct data processing systems 100 to orchestrator 102 for management.

Voucher management service 104 may provide vouchers (e.g., including information usable to validate a root of trust and delegate authority over a data processing system to another entity) to entities with permissions to onboard and/or manage data processing systems 100. To provide its functionality, voucher management service may: (i) obtain a data package from orchestrator 102 that is attempting to onboard a data processing system of data processing systems 100 and/or (ii) determine whether the data package includes a trusted token. If the data package includes the trusted token, voucher management service 104 may: (i) obtain a voucher for the data processing system, and/or (ii) provide the voucher to orchestrator 102 to facilitate the onboarding of the data processing system.

Orchestrator 102 may onboard data processing systems to provide desired computer-implemented services. To onboard data processing systems, orchestrator 102 may: (i) obtain the trusted token from the user, (ii) provide the trusted token to voucher management service 104 upon identification of a data processing system that requires (and/or will require in the future, such as after being purchased by an operator of a deployment of data processing systems) onboarding, (iii) obtain the voucher in response to providing the trusted token to voucher management service 104, and/or (iv) may utilize the voucher to onboard and/or further manage the data processing system.

When performing their functionality, data processing systems 100, orchestrator 102, and/or voucher management service 104 may perform all, or a portion, of the methods and/or actions shown in FIGS. 2A-3B.

Data processing systems 100, orchestrator 102, and/or voucher management service 104 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

In an embodiment, one or more of data processing systems 100, orchestrator 102, and/or voucher management service 104 are implemented using an internet of things (IoT) device, which may include a computing device. The IoT device may operate in accordance with a communication model and/or management model known to data processing systems 100, orchestrator 102, voucher management service 104, other data processing systems, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

Figure 2A:
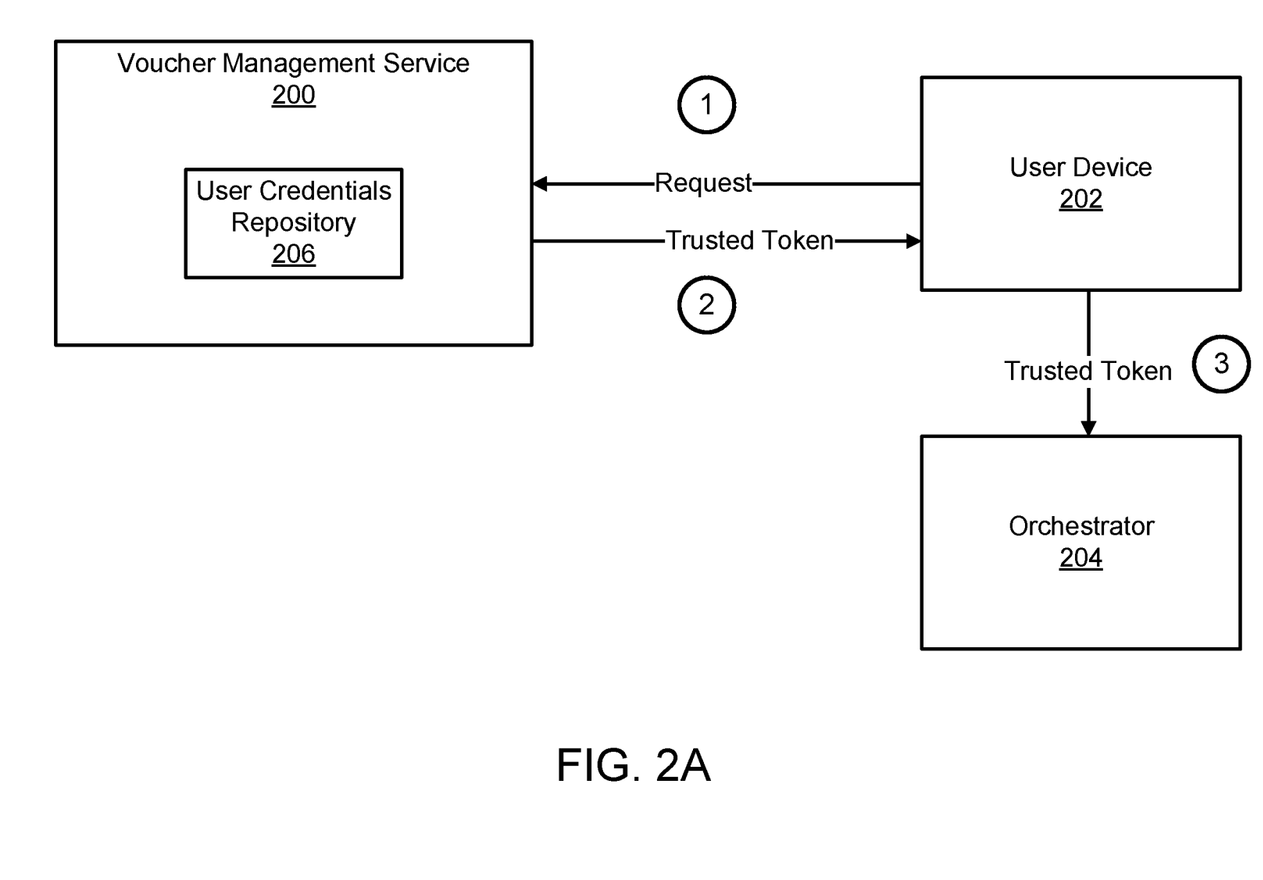
FIG. 2A shows a diagram of a voucher management service providing a trusted token to a user device in accordance with an embodiment.
Figure 2B:
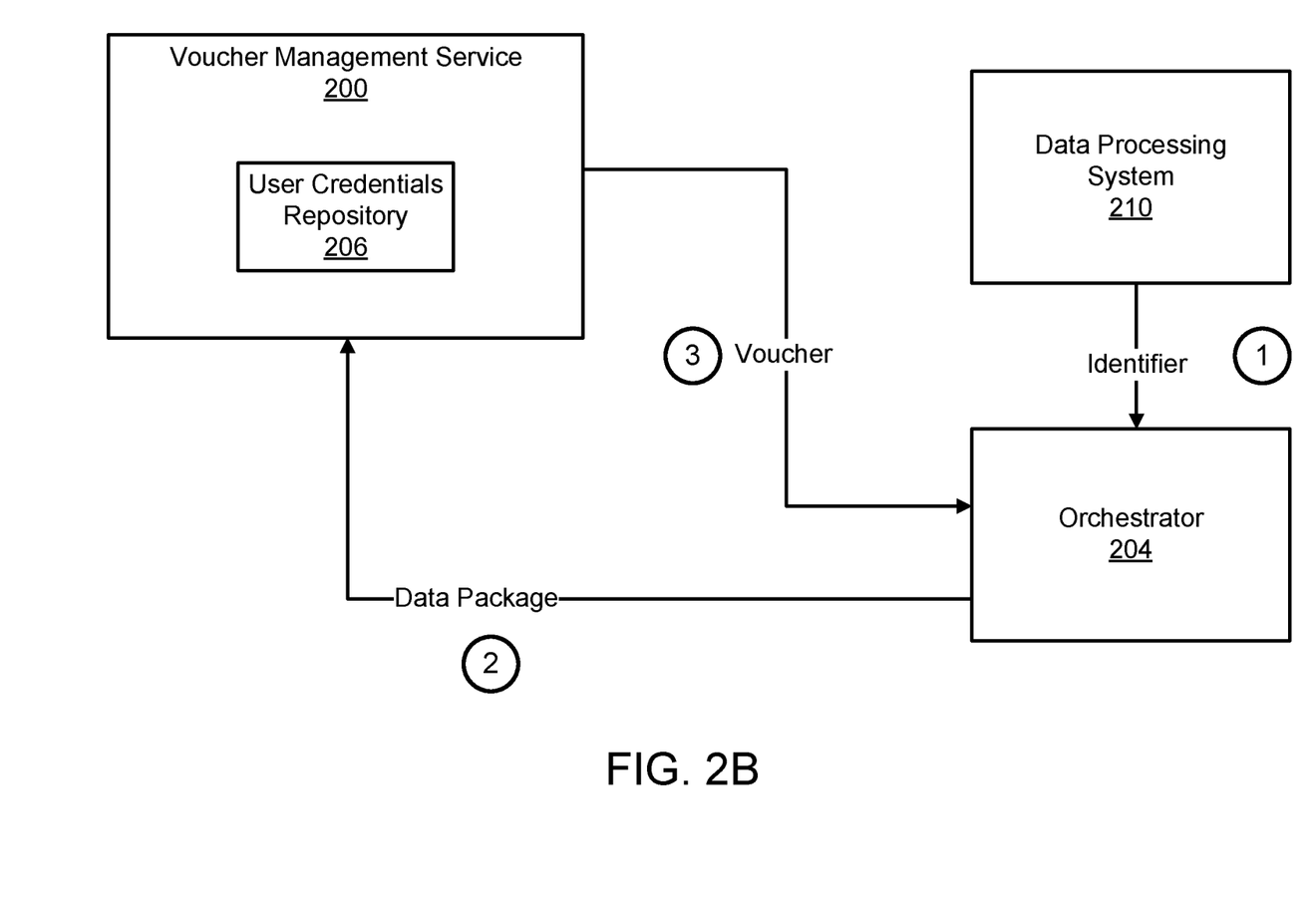
FIG. 2B shows a diagram of a voucher management service providing a voucher to an orchestrator in accordance with an embodiment.

As discussed above, embodiments disclosed herein may facilitate onboarding of data processing systems. FIGS. 2A-2B show diagrams illustrating various operations that may be performed to prepare for and/or to onboard data processing systems.

Turning to FIG. 2A, a diagram of a voucher management service providing a trusted token to a user device in accordance with an embodiment is shown. In FIG. 2A, circles including numbers are used to indicate operations occurring at different points in time. For example, all operations described with reference to number one (1) may occur at a first point in time and all operations described with reference to the number two (2) may occur at a second point in time after the first point in time. While the operations are provided in an example temporal order (e.g., time point one before time point two), it will be appreciated that the operations may be performed in other orders from those illustrated and described herein.

At time point one (1), user device 202 may provide a request to voucher management service 200. User device 202 may be similar to any of data processing systems 100 shown in FIG. 1 and may be operated by a user with authority over data processing systems throughout a distributed environment (e.g., which may have been purchased from another entity). The request may include: (i) access credentials for the user, (ii) credentials for orchestrator 204 (e.g., similar to orchestrator 102 shown in FIG. 1), and/or (iii) other information usable to establish authority of the user for management of the data processing system and/or manage onboarding for the data processing system.

The access credentials for the user may include any identifying information usable to authenticate the identity of the user. For example, the access credentials may include a password, pin, biometric factor (e.g., fingerprint, etc.), and/or other information.

The credentials for orchestrator 204 may include any identifier (e.g., an internet protocol (IP) address, a globally unique identifier, etc.) for orchestrator 204. The credentials for orchestrator 204 may be usable by voucher management service 200 to identify an entity throughout the distributed environment. In FIG. 2A, the credentials for orchestrator 204 may indicate to which device user device 202 delegates authority for device onboarding/management purposes.

Voucher management service 200 may obtain the request and compare the access credentials included in the request to corresponding information stored in user credentials repository 206. User credentials repository 206 may include, for example, hashed passwords associated with different users and/or other types of information usable to authenticate the credentials in the request. For example, upon receipt of the request, voucher management service 200 may generate a hash of the password included in the request and may compare the hash of the password from the request to a corresponding hashed password associated with the user (e.g., which may be part of an account with the entity from which data processing systems may be obtained, such as a manufacturer, reseller, etc.). If the hash of the password from the request matches the hashed password stored in user credentials repository 206, voucher management service 200 may trust that the request originated from the user operating user device 202.

At time point two (2), voucher management service 200 may provide a trusted token to user device 202 in response to the request. Voucher management service 200 may generate the trusted token upon verification of the access credentials and/or other information included in the request. The trusted token may include: (i) a payload including the credentials for orchestrator 204 (provided in the request), and a trusted signature (e.g., cryptographic information generated using a trusted private key (or other type of secret, such as a symmetric key) maintained by voucher management service 200). The trusted signature may, for example, allow voucher management service 200 to determine whether an orchestrator that has the trusted token is an orchestrator for which the trusted token was generated, whether the credentials of orchestrator 204 have been modified since the trusted token was generated, etc.

At time point three (3), user device 202 may provide the trusted token to orchestrator 204. By providing the trusted token to orchestrator 204, orchestrator 204 may use the trusted token to indicate its status as an entity trusted by user device 202 (e.g., and, therefore, the user) to onboard and/or further manage data processing systems under the authority of the user. Consequently, when orchestrator 204 provides the trusted token in the future, it may serve to authenticate orchestrator 204 with respect to obtaining vouchers managed by voucher management service 200.

Turning to FIG. 2B, a diagram of voucher management service 200 providing a voucher to orchestrator 204 in accordance with an embodiment is shown. In FIG. 2B, circles including numbers are used to indicate operations occurring at different points in time. For example, all operations described with reference to number one (1) may occur at a first point in time and all operations described with reference to the number two (2) may occur at a second point in time after the first point in time. While the operations are provided in temporal order (e.g., time point one before time point two), it will be appreciated that the operations may be performed in other orders from those illustrated and described herein.

Consider a scenario in which data processing system 210 is added (e.g., through purchase or other mechanism) to a highly distributed environment and requires onboarding (e.g., set up of access restrictions, installation of software, modification of settings, etc.) to participate in the provision of computer-implemented services. To onboard data processing system 210 without intervention by a user with authority over data processing system 210, orchestrator 204 may obtain a voucher from voucher management service 200.

At time point one (1), data processing system 210 may provide an identifier to orchestrator 204. The identifier may include any information (e.g., an IP address, a data structure indicating ownership by the user, a notification, etc.) usable to indicate that data processing system 210 is under authority of the user and has been added to the distributed environment.

Upon receipt of the identifier and/or responsive to other types of events (e.g., such as at time of purchase and/or prior to data processing system 210 joining the distributed environment), orchestrator 204 may seek to obtain a voucher from voucher management service 200 to perform the onboarding process. At time point two (2), orchestrator 204 may provide a data package to voucher management service 200. The data package may include: (i) the trusted token (described in FIG. 2A), (ii) the credentials for the orchestrator (described in FIG. 2A), (iii) a public key associated with the orchestrator, and/or (iv) other information.

The public key for the orchestrator (e.g., orchestrator 204) may be a public key (e.g., a string of letters, numbers, other characters, etc.) associated with orchestrator 204 that is available publicly and is usable to verify signatures generated using a private key maintained by orchestrator 204 (e.g., orchestrator 204 may sign work orders for data processing system 210 using the private key).

Upon receipt of the data package, voucher management service 200 may verify that the trusted token matches the trusted token generated by voucher management service 200 (shown in FIG. 2A). If the trusted token has not been altered (and therefore indicates that orchestrator 204 is to be trusted for vouchers for data processing systems under authority of the user), voucher management service 200 may provide a voucher to orchestrator 204.

At time point three (3) voucher management service 200 may provide the voucher to orchestrator 204 to facilitate onboarding of data processing system 210 by orchestrator 204. The voucher may include: (i) verification data usable to validate a root of trust for the data processing system (e.g., data processing system 210), and (ii) at least one delegation of authority from the root of trust to the public key (e.g., associated with orchestrator 204).

The root of trust may be based on a designated private key and the verification data may include a corresponding public key for the designated private key. The designated private key may be any private key associated with another entity (e.g., a string of numbers and/or letters known kept secret by the other entity) usable for generating signatures. The other entity may be, for example, the manufacturer of data processing system 210. The corresponding public key for the designated private key may be any public key (e.g., a string of letters and/or numbers) associated with the manufacturer that is known publicly and is usable to verify signatures generated by the private key.

The at least one delegation of authority from the root of trust to the public key may include a certificate. The certificate may include: (i) a payload including an intermediate public key, (ii) a signature generated using the designated private key, and/or (iii) other information. The at least one delegation of authority may include a certificate chain. The certificate chain may establish cryptographically verifiable delegations of authority from the root of trust to orchestrator 204.

The payload may include a statement of delegation indicating which privileges are being delegated to the entity associated with the intermediate public key. For example, the payload may indicate that all authority to manage, onboard, and/or otherwise modify data processing system 210 is being delegated to an intermediate entity. The intermediate entity may be, for example, a client that is selling data processing system 210 to another client. The intermediate public key may be any public key (e.g., a string of letters, numbers, and/or other characters) associated with the intermediate entity that is publicly available and usable for to encrypt data intended to be decrypted by only the intermediate entity. The payload may include any number of such certificates that establish a cryptographically verifiable certificate chain between the root of trust and the public key associated with the designed private key (e.g., managed by orchestrator 204).

The signature generated using the designated private key (e.g., a private key kept secret by the manufacturer of data processing system 210) may include cryptographic information generated using the payload and the designated private key. The cryptographic information may include a hash of the information and/or any other type of cryptographic information.

The certificate may also include a second certificate. The second certificate may include: (i) a second payload including the public key for the orchestrator (e.g., orchestrator 204), (ii) a second signature generated using an intermediate private key corresponding to the intermediate public key, and/or (iii) other information.

The second payload may include a second statement of delegation indicating which privileges are being delegated to orchestrator 204. For example, the second payload may indicate that orchestrator 204 is being delegated authority to onboard data processing system 210.

The second signature generated using the intermediate private key may include cryptographic information generated using the payload and the intermediate private key (e.g., kept secret by the intermediate entity). The cryptographic information may include a hash of the information and/or any other type of cryptographic information.

Following obtaining the voucher, orchestrator 204 may proceed to perform onboarding operations and/or other actions to manage data processing system 210.

The onboarding operations may include, for example, contacting and providing a copy of the voucher to a rendezvous system (not shown). Data processing system 210 may contact the rendezvous system may default upon first power up. Data processing system 210 may be directed to orchestrator 204 by the rendezvous system, and may obtain a copy of the voucher from the rendezvous system or orchestrator 204. Consequently, when data processing system 210 contacts orchestrator 204, data processing system 210 may have access to a trusted key (e.g., from the voucher) usable to cryptographically verify authority of orchestrator 204 to invoke various functions of data processing system 210. For example, to prepare data processing system 210 to provide certain services, orchestrator 204 may generate workorders instructing data processing system 210 to install various pieces of software components, modify configurations of software and/or hardware components, and/or perform other actions.

In an embodiment, the one or more entities performing the operations shown in FIGS. 2A-2B are implemented using a processor adapted to execute computing code stored on a persistent storage that when executed by the processor performs the functionality of the system of FIG. 1 discussed throughout this application. The processor may be a hardware processor including circuitry such as, for example, a central processing unit, a processing core, or a microcontroller. The processor may be other types of hardware devices for processing information without departing from embodiments disclosed herein.

Figure 3A:
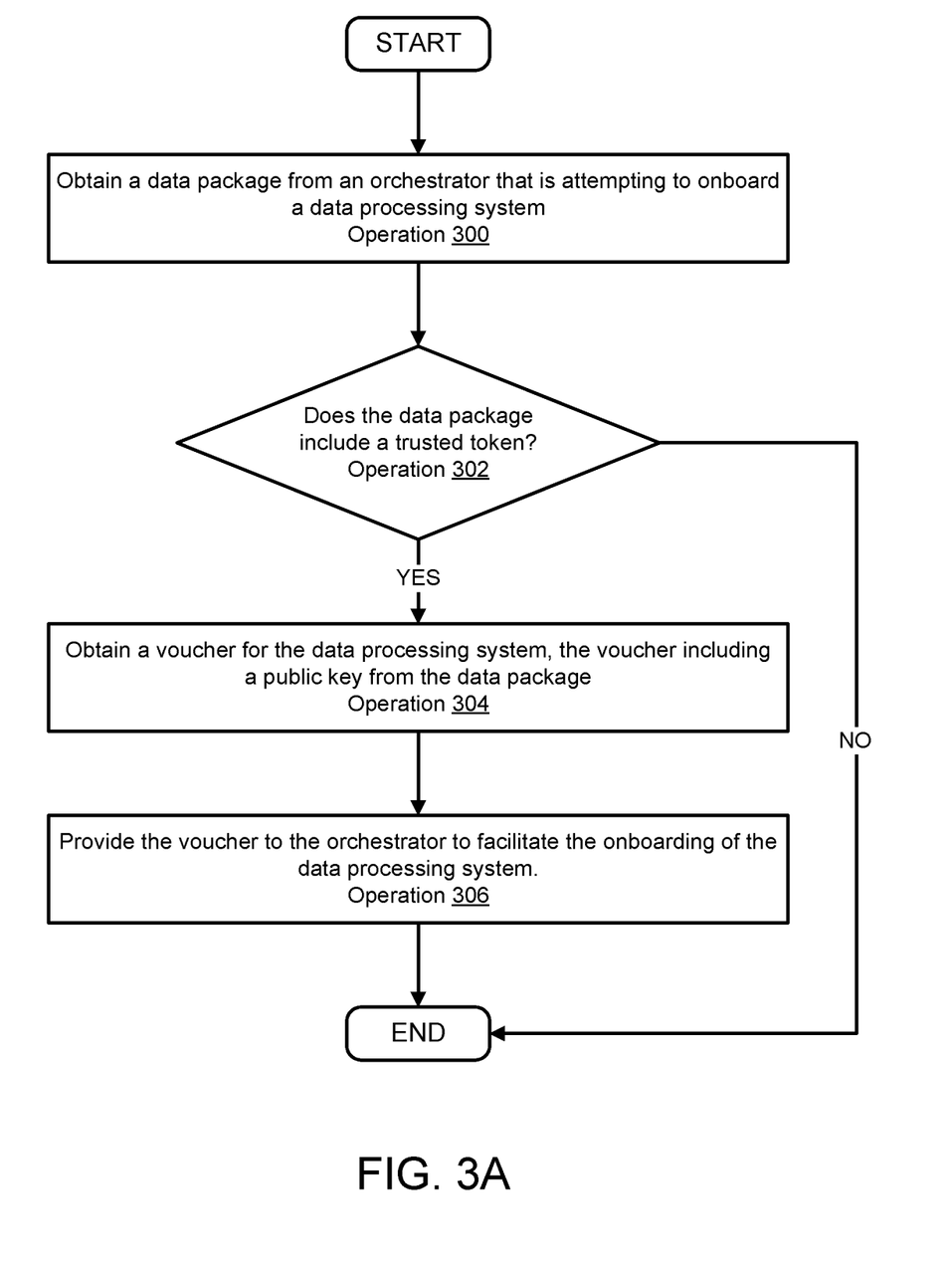
FIG. 3A shows a flow diagram illustrating a method of providing a voucher to an orchestrator in accordance with an embodiment.
Figure 3B:
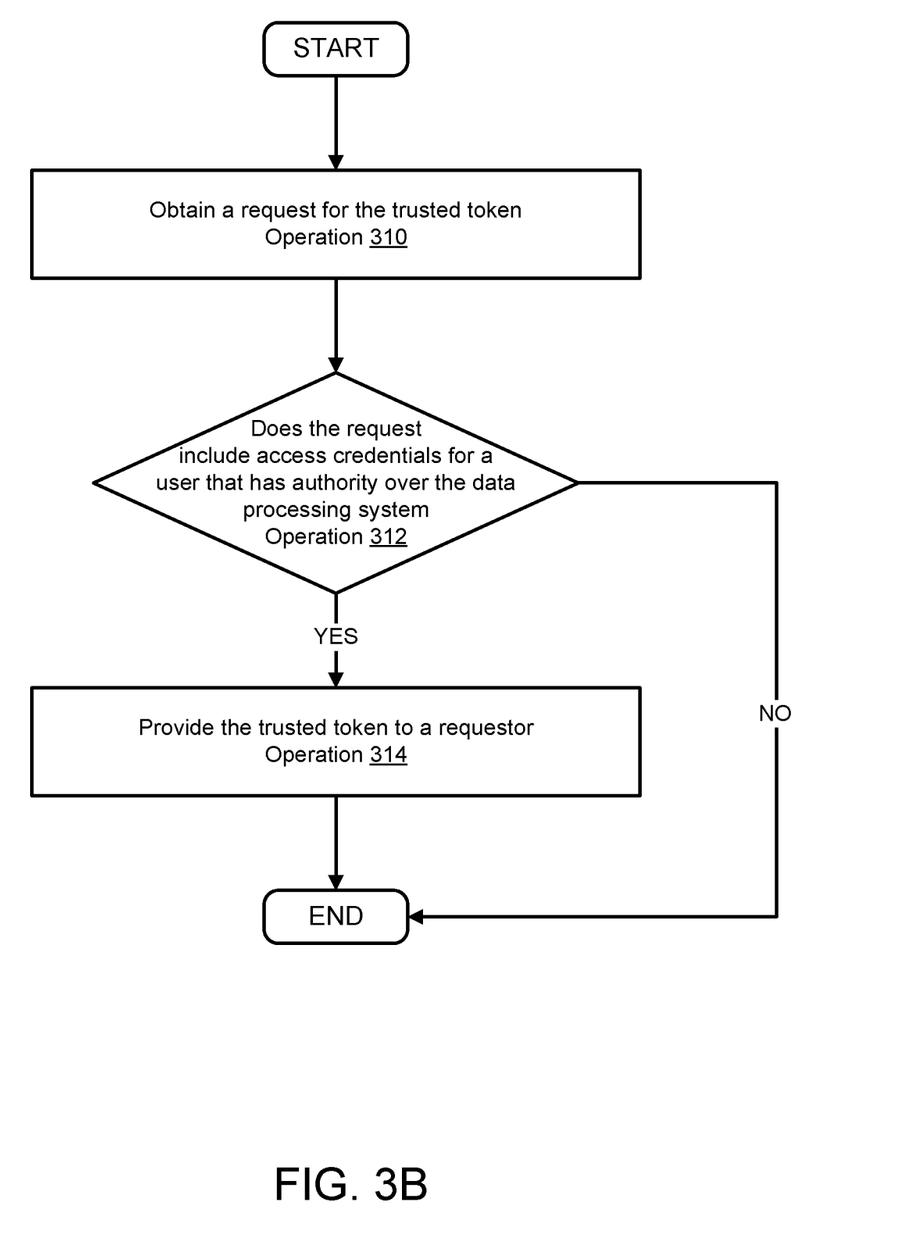
FIG. 3B shows a flow diagram illustrating a method of obtaining a trusted token in accordance with an embodiment.

As discussed above, the components of FIG. 1 may perform various methods to manage operation of a data pipeline. FIGS. 3A-3B illustrate methods that may be performed by the components of FIG. 1. In the diagram discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of providing a voucher to an orchestrator in accordance with an embodiment is shown. The method may be performed, for example, by a voucher management service, an orchestrator, a data processing system, and/or any other entity.

At operation 300, a data package is obtained from an orchestrator that is attempting to onboard a data processing system. Obtaining the data package may include: (i) receiving the data package from the orchestrator in the form of a transmission over a communications system, (ii) reading the data package from storage, and/or (iii) other methods.

At operation 302, it is determined whether the data package includes a trusted token. Determining whether the data package includes the trusted token may include: (i) comparing the content of the data package to a copy of the trusted token maintained in storage, (ii) providing the data package to another entity responsible for determining whether the data package includes the trusted token, and/or (iii) other methods.

Comparing the content of the data package to the copy of the trusted token may include: (i) comparing the credentials for the orchestrator included in the data package to previously obtained credentials for the orchestrator stored in storage, (ii) generating a new trusted signature using the credentials for the orchestrator stored in storage and a trusted private key and comparing the new trusted signature to the trusted signature included in the data package, and/or (iii) other methods.

If the data package includes the trusted token, the method may proceed to operation 304. If the data package does not include the trusted token, the method may end following operation 302.

At operation 304, a voucher is obtained for the data processing system, the voucher including a public key from the data package. The voucher may be obtained by: (i) generating the voucher, (ii) reading the voucher from storage, (iii) receiving the voucher from another entity, and/or (iv) other methods.

Generating the voucher may include: (i) obtaining a public key associated with the orchestrator from the data package, (ii) encapsulating the public key (and/or other data) in a data structure, (iii) treating the data structure as the voucher, and/or (iv) other methods.

At operation 306, the voucher is provided to the orchestrator to facilitate the onboarding of the data processing system. Providing the voucher to the orchestrator may include: (i) transmitting the voucher to the orchestrator in the form of a message over a communications system, (ii) providing the voucher to another entity and providing the other entity with instructions to provide the voucher to the orchestrator, (iii) storing the voucher in a database and providing the orchestrator with access credentials to access the database, and/or (iv) other methods.

The method may end following operation 306.

Turning to FIG. 3B, a flow diagram illustrating a method of obtaining a trusted token in accordance with an embodiment is shown. The method may be performed, for example, by a voucher management service, an orchestrator, a data processing system, and/or any other entity. The operations shown in FIG. 3B may be performed prior to the operations shown in FIG. 3A in order to generate the trusted token usable in FIG. 3A to facilitate onboarding of data processing system.

At operation 310, a request is obtained for the trusted token. Obtaining the request may include: (i) receiving the request in the form of a transmission over a communications system, (ii) reading the request from storage, and/or (iii) other methods.

At operation 312, it is determined whether the request includes access credentials for a user that has authority over the data processing system. Determining whether the request includes the access credentials may include: (i) comparing the access credentials provided in the request to a stored version of the access credentials (e.g., a hash of a password, etc.), (ii) providing the request to another entity responsible for determining whether the request includes the access credentials, and/or (iii) other methods.

If the request includes the access credentials, the method may proceed to operation 314. If the request does not include the access credentials, the method may end following operation 312.

At operation 314, the trusted token is provided to a requestor. Providing the trusted token to the requestor may include obtaining the trusted token. Obtaining the trusted token may include: (i) generating the trusted token, (ii) requesting the trusted token from another entity, and/or (iii) other methods. Providing the trusted token to the requestor may also include: (i) transmitting the trusted token to the requestor in the form of a message over a communications system, (ii) transmitting the trusted token to another entity responsible for transmitting the trusted token to the requestor, and/or (iii) other methods.

The method may end following operation 314.

Figure 4:
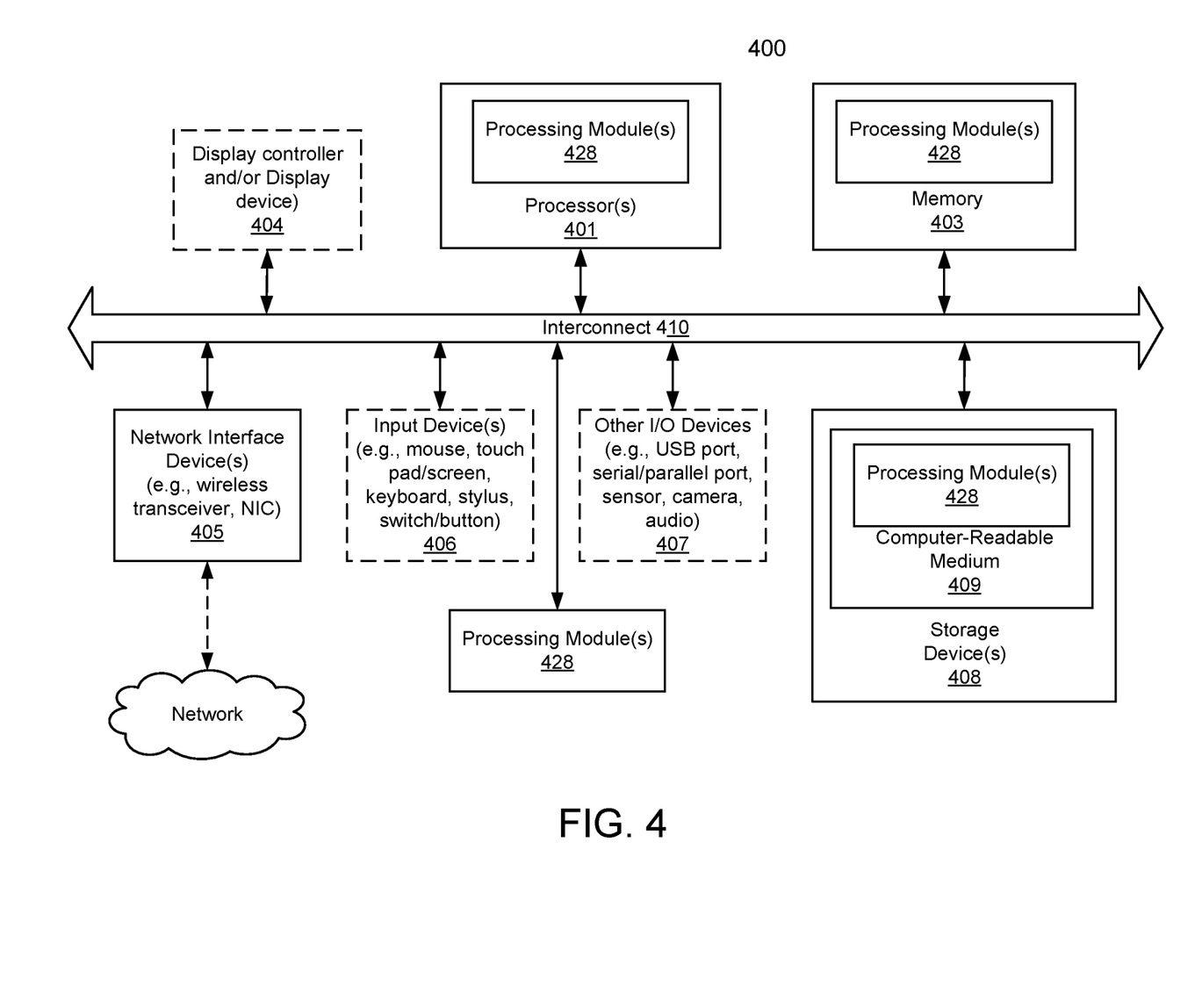
FIG. 4 shows a block diagram illustrating a data processing system in accordance with an embodiment.

Any of the components illustrated in FIGS. 1-3B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing data processing systems, the method comprising:
    by a voucher management service system that is embodied by a computing device that is configured to provide vouchers for onboarding of the data processing systems by an orchestrator separate from the voucher management service system:
        obtaining a data package from the orchestrator as the orchestrator is attempting to onboard a data processing system of the data processing systems, the orchestrator being separate from the voucher management service system;
        making a determination regarding whether the data package comprises a trusted token;
        in an instance of the determination in which the data package comprises the trusted token:
            obtaining a voucher for the data processing system, the voucher being one of the vouchers and comprising a public key of the orchestrator; and
            providing the voucher to the orchestrator to facilitate the onboarding of the data processing system, wherein the onboarding of the data processing system comprises the orchestrator providing the data processing system with at least configuration data for the data processing system to modify a configuration of existing software and hardware components installed within the data processing system,
        wherein prior to obtaining the data package from the orchestrator, the method further comprises and by the voucher management service system:
            obtaining a request for the trusted token from a user associated with the data processing system;
            making a second determination regarding whether the request comprises access credentials for the user, the access credentials indicating that the user has authority over the data processing system; and
            in an instance of the second determination in which the request comprises the access credentials, providing the trusted token to a requestor.
2. The method of claim 1, wherein the request comprises credentials for the orchestrator, wherein the trusted token comprises:
    a payload comprising the credentials for the orchestrator, and
    a signature generated using a trusted private key.
3. The method of claim 1, wherein the trusted token comprises:
    credentials for the orchestrator; and
    a trusted signature.
4. The method of claim 3, wherein the data package comprises:
    the trusted token;
    the credentials for the orchestrator; and
    the public key for the orchestrator.
5. The method of claim 4, wherein the voucher comprises:
    verification data usable to validate a root of trust for the data processing system; and
    at least one delegation of authority from the root of trust to the public key.
6. The method of claim 5, wherein the root of trust is a designated private key and the verification data is a corresponding public key for the designated private key.
7. The method of claim 6, wherein the at least one delegation of authority comprises:
    a certificate comprising:
        a payload comprising an intermediate public key; and
        a signature generated using the designated private key.
8. The method of claim 7, wherein the certificate further comprises:
    a second certificate comprising:
        a second payload comprising the public key for the orchestrator; and
        a second signature generated using an intermediate private key corresponding to the intermediate public key.
9. A non-transitory machine-readable medium having instructions stored therein, which when executed by a processor of a voucher management service system that is embodied by a computing device, cause the processor to perform operations for managing data processing systems by at least providing vouchers for onboarding of the data processing systems by an orchestrator separate from the voucher management service system, the operations comprising:
    obtaining a data package from the orchestrator as the orchestrator is attempting to onboard a data processing system of the data processing systems, the orchestrator being separate from the voucher management service system;
    making a determination regarding whether the data package comprises a trusted token;
    in an instance of the determination in which the data package comprises the trusted token:
        obtaining a voucher for the data processing system, the voucher being one of the vouchers and comprising a public key of the orchestrator; and
        providing the voucher to the orchestrator to facilitate the onboarding of the data processing system, wherein the onboarding of the data processing system comprises the orchestrator providing the data processing system with at least configuration data for the data processing system to modify a configuration of existing software and hardware components installed within the data processing system,
    wherein prior to obtaining the data package from the orchestrator, the operations further comprise:
        obtaining a request for the trusted token from a user associated with the data processing system;

making a second determination regarding whether the request comprises access credentials for the user, the access credentials indicating that the user has authority over the data processing system; and
in an instance of the second determination in which the request comprises the access credentials, providing the trusted token to a requestor.

10. The non-transitory machine-readable medium of claim 9, wherein the request comprises credentials for the orchestrator, wherein the trusted token comprises:
a payload comprising the credentials for the orchestrator, and
a signature generated using a trusted private key.

11. The non-transitory machine-readable medium of claim 9, wherein the trusted token comprises:
credentials for the orchestrator; and
a trusted signature.

12. The non-transitory machine-readable medium of claim 11, wherein the data package comprises:
the trusted token;
the credentials for the orchestrator; and
the public key for the orchestrator.

13. The non-transitory machine-readable medium of claim 12, wherein the voucher comprises:
verification data usable to validate a root of trust for the data processing system; and
at least one delegation of authority from the root of trust to the public key.

14. A voucher management service system embodied by a computing device, the voucher management service system comprising:
a processor; and
a memory coupled to the processor to store instructions, which when executed by the processor, cause the processor to perform operations for managing data processing systems by at least providing vouchers for onboarding of the data processing systems by an orchestrator separate from the voucher management service system, the operations comprising:
obtaining a data package from the orchestrator as the orchestrator is attempting to onboard a data processing system of the data processing systems, the orchestrator being separate from the voucher management service system;
making a determination regarding whether the data package comprises a trusted token;
in an instance of the determination in which the data package comprises the trusted token:
obtaining a voucher for the data processing system, the voucher being one of the vouchers and comprising a public key of the orchestrator; and
providing the voucher to the orchestrator to facilitate the onboarding of the data processing system, wherein the onboarding of the data processing system comprises the orchestrator providing the data processing system with at least configuration data for the data processing system to modify a configuration of existing software and hardware components installed within the data processing system,
wherein prior to obtaining the data package from the orchestrator, the operations further comprise:
obtaining a request for the trusted token from a user associated with the data processing system;
making a second determination regarding whether the request comprises access credentials for the user, the access credentials indicating that the user has authority over the data processing system; and
in an instance of the second determination in which the request comprises the access credentials, providing the trusted token to a requestor.

15. The voucher management service system of claim 14, wherein the request comprises credentials for the orchestrator, wherein the trusted token comprises:
a payload comprising the credentials for the orchestrator, and
a signature generated using a trusted private key.

16. The voucher management service system of claim 14, wherein the trusted token comprises:
credentials for the orchestrator; and
a trusted signature.

17. The method of claim 1, wherein prior to being onboarded, the existing software and hardware components of the data processing system lack the configuration data provided by the orchestrator, and the configuration data being needed by the existing software and hardware components for the data processing system to independently provision one or more computer-implemented services requested by a user associated with the data processing system.

18. The non-transitory machine-readable medium of claim 13, wherein the root of trust is a designated private key and the verification data is a corresponding public key for the designated private key.

19. The non-transitory machine-readable medium of claim 18, wherein the at least one delegation of authority comprises:
a certificate comprising:
a payload comprising an intermediate public key; and
a signature generated using the designated private key.

20. The non-transitory machine-readable medium of claim 19, wherein the certificate further comprises:
a second certificate comprising:
a second payload comprising the public key for the orchestrator; and
a second signature generated using an intermediate private key corresponding to the intermediate public key.

* * * * *